(No Model.) 2 Sheets—Sheet 1.

C. GARVER.
SAW SWAGE.

No. 562,521. Patented June 23, 1896.

WITNESSES:
J. W. Wilson
Emmett V. Harris

Charles Garver  INVENTOR
BY W. G. Burns
his ATTORNEY.

(No Model.) 2 Sheets—Sheet 2.

C. GARVER.
SAW SWAGE.

No. 562,521. Patented June 23, 1896.

WITNESSES:
T. W. Wilson
Emmett V. Harris

Charles Garver INVENTOR
BY W. G. Burns
his ATTORNEY.

ANDREW B. GRAHAM, PHOTO-LITHO, WASHINGTON, D.C.

UNITED STATES PATENT OFFICE.

CHARLES GARVER, OF FORT WAYNE, INDIANA, ASSIGNOR OF ONE-HALF TO OREN R. YERKS, OF CHAMBERLAIN, INDIANA.

SAW-SWAGE.

SPECIFICATION forming part of Letters Patent No. 562,521, dated June 23, 1896.

Application filed January 20, 1896. Serial No. 576,070. (No model.)

*To all whom it may concern:*

Be it known that I, CHARLES GARVER, a citizen of the United States, residing at Fort Wayne, in the county of Allen and State of Indiana, have invented certain new and useful Improvements in Saw-Swages; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in saw-swages in which a movable guide-plate having gage-blocks is used in conjunction with a stock having fixed diverging jaws; and the objects of my improvements are, first, to provide an instrument for swaging the teeth of saws in such a manner that after-dressing will be unnecessary, and second, to provide means for holding the teeth of the saw in position while being swaged. I attain these objects by the construction illustrated in the accompanying drawings, in which—

Figure 1:
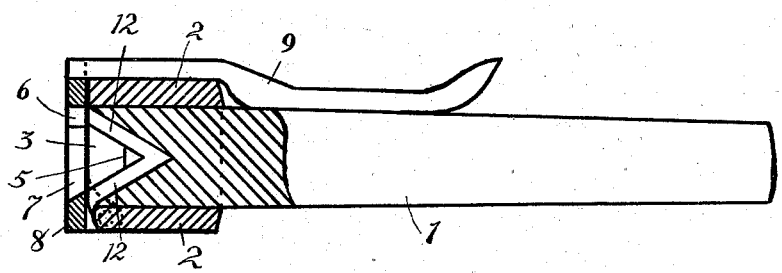
Figure 2:
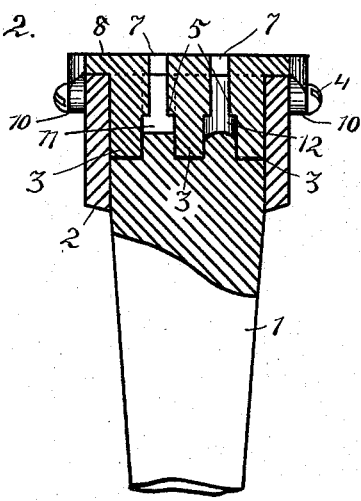
Figure 3:
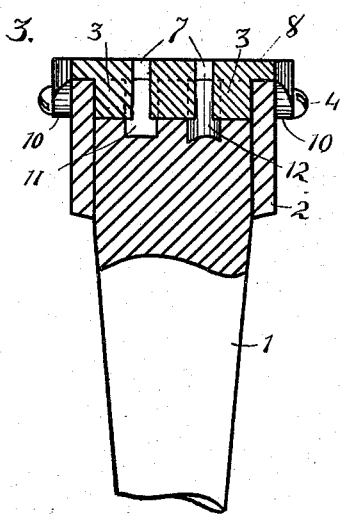
Figure 4:
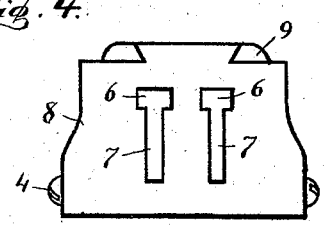
Figure 5:
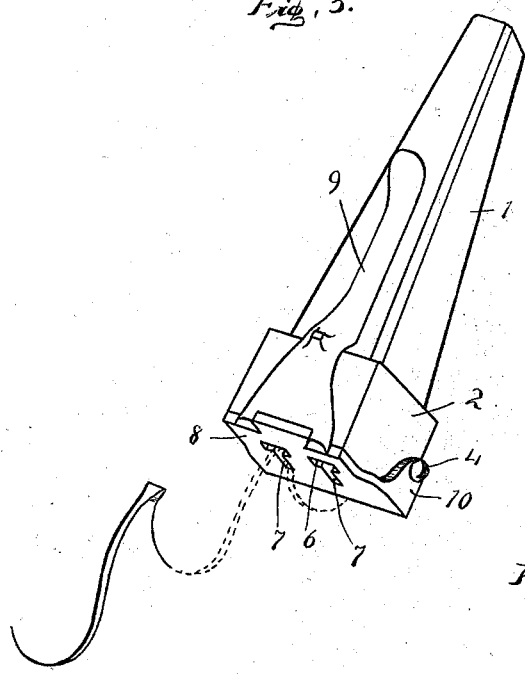
Figure 6:
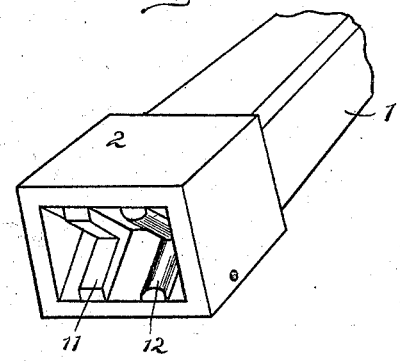

Figure 1 is a longitudinal section showing the diverging jaws, the guide-plate, and latch; Fig. 2, a section at right angles to that of Fig. 1; Fig. 3, a modification of Fig. 2; Fig. 4, a plan of the guide-plate, showing the openings for admitting the swaged teeth; Fig. 5, a perspective of the device mounted upon the tooth of a saw, and Fig. 6 a perspective showing the diverging jaws.

Similar numerals of reference refer to similar parts throughout the several views.

The stock 1 of the instrument is constructed of steel, is sectionally rectangular in shape, and of sufficient length to form a convenient handhold for the operator. In the end of this stock is formed a V-shaped hollow, upon the oblique faces of which protrude the jaws 11 and 12. These jaws are shown to be integral with the stock, but they may be made separately and inserted in slots cut into the stock.

The faces of the jaws 12 are convex transversely, and slant inwardly, terminating sharply at their vertex. The jaws 11 are similar to those just described with the exception that their faces are flat.

A band of metal 2 is shrunk around the end of the stock having the jaws, and forms the head of the tool. It also serves to prevent the jaws from spreading.

The guide-plate 8 is provided with perforated lugs 10, which extend downward and are hinged to the band 2 by means of screws 4 4. The slots 7 7 in the guide-plate are located immediately over the jaws 11 and 12. The enlargements 6 6 at the ends of the slots permit the insertion and withdrawal of the swaged ends of the teeth, when the guide-plate is raised. The handle or latch 9 is rigidly secured to the side of the plate 8 opposite the hinge, and is intended to hold the said plate in its proper position when in use by the operator, who grasps and holds together the said latch and stock 1.

The projecting lugs 3 3 3 are integral with the plate 8, and extend downward between and on both sides of the jaws. These lugs are divided by the slots 7 7, which extend downward to the offsets 5 5, leaving enlargements or cavities over the vertices of the jaws.

In Fig. 3 is shown a modified form, in which the vertices of the jaws are sunk into the stock. The lugs 3 3 partly cover the faces of the jaws and extend downward, leaving cavities over the vertices of the jaws in a similar manner to the form shown in Fig. 2. By lifting the latch 9 the plate 8 is thrown outward, and the point of the saw-tooth may be inserted through one of the openings 7 7, and rested against the vertex of one of the jaws. The latch is then returned to its normal position and held against the stock by the hand of the operator. Blows are then struck with a hammer at the other end of the stock with sufficient force to upset the point of the tooth and fill the cavity over the vertex of the jaws with the metal of the tooth. The plate 8 is then raised and the point of the tooth thus enlarged may be withdrawn through the enlarged end 6 of the slot 7.

The teeth are given initial treatment with the convex faced jaws 12, which having a rounded vertex will more readily spread the points of the teeth, and the flat jaws 11 are subsequently used to give the teeth their final shape.

Usually in the ordinary method of swaging it is necessary to dress the teeth with a side fill to give a uniform width to the cutting edges of the teeth, but with my device the teeth are all spread to the same width, being limited to the shape and size of the cavity over the vertex of the jaws.

Having described my invention and the manner in which the same is used, what I claim as new, and desire to secure by Letters Patent, is—

A tool for swaging the teeth of saws, comprising the stock 1, the flat and convex faced diverging jaws 11 and 12 respectively, the hinged plate 8 having the guide-slots 7 7 registering over the said jaws, the lugs 3 3 integral with the said plate and having the offsets 5 5, and the latch 9 for holding the said plate in position, substantially as shown and described.

In testimony whereof I affix my signature in presence of two witnesses.

CHARLES $\overset{\text{his}}{\times}$ GARVER.
mark

Witnesses:
    EMMETT V. HARRIS,
    JAMES M. YERKS.